United States Patent
Kolli et al.

(10) Patent No.: US 10,079,002 B2
(45) Date of Patent: Sep. 18, 2018

(54) MODIFYING GRAPHICAL ELEMENTS BASED ON ENVIRONMENT

(71) Applicant: Microsoft Technology Licensing, LLC, Redmond, WA (US)

(72) Inventors: Samish Chandra Kolli, Mountain View, CA (US); Sivakumar Loganathan, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/196,166

(22) Filed: Jun. 29, 2016

(65) Prior Publication Data

US 2018/0005605 A1 Jan. 4, 2018

(51) Int. Cl.
| | |
|---|---|
| G09G 5/00 | (2006.01) |
| G09G 5/36 | (2006.01) |
| G06F 3/0346 | (2013.01) |
| G09G 5/10 | (2006.01) |
| G09G 5/373 | (2006.01) |
| G06F 3/0488 | (2013.01) |
| G06F 3/0484 | (2013.01) |

(52) U.S. Cl.
CPC .......... *G09G 5/363* (2013.01); *G06F 3/0346* (2013.01); *G06F 3/04847* (2013.01); *G06F 3/04886* (2013.01); *G09G 5/10* (2013.01); *G09G 5/373* (2013.01); *G09G 2320/08* (2013.01); *G09G 2354/00* (2013.01); *G09G 2360/144* (2013.01)

(58) Field of Classification Search
CPC ........................................ G06F 3/048–3/04897
See application file for complete search history.

(56) References Cited

U.S. PATENT DOCUMENTS

| | | | | | |
|---|---|---|---|---|---|
| 5,956,029 | A | * | 9/1999 | Okada | G06F 9/4443 715/719 |
| 8,487,786 | B1 | * | 7/2013 | Hussey | G08G 5/0021 340/955 |
| 9,244,604 | B1 | * | 1/2016 | Lewbel | G06F 3/0488 |
| 2011/0035552 | A1 | * | 2/2011 | Heynen | G06F 3/0481 711/126 |
| 2012/0280901 | A1 | * | 11/2012 | Kim | G06F 3/017 345/156 |
| 2013/0035139 | A1 | * | 2/2013 | Sheynblat | G06F 1/1626 455/566 |
| 2014/0082514 | A1 | * | 3/2014 | Sivaraman | G06F 3/0219 715/745 |
| 2014/0331129 | A1 | * | 11/2014 | Saeki | G06F 3/016 715/702 |
| 2015/0177945 | A1 | * | 6/2015 | Sengupta | G06F 3/0488 715/744 |
| 2017/0177203 | A1 | * | 6/2017 | Davidov | G06F 3/04883 |

* cited by examiner

*Primary Examiner* — Charles Tseng
(74) *Attorney, Agent, or Firm* — Schwegman Lundberg & Woessner, P.A.

(57) ABSTRACT

This disclosure relates to systems and methods for modifying graphical element according to an environment. In one example, a method includes receiving inputs from one or more environmental detectors that indicate an environment, receiving identification of one or more graphical elements at a graphical user interface, and modifying the identified graphical elements to adjust member effort interacting with the identified graphical elements and according to the environment of the system.

18 Claims, 8 Drawing Sheets

MODIFYING GRAPHICAL ELEMENTS BASED ON ENVIRONMENT

TECHNICAL FIELD

The subject matter disclosed herein generally relates to user interfaces, and more particularly to modifying graphical elements according to a detected environment.

BACKGROUND

Mobile computing devices are becoming more and more prevent in modern society. From watches, to phones, to tables, to laptops, they find themselves in a wide variety of different environments. Changing graphical elements according to the environment is a challenge.

Typically, a system adjusts brightness of a display according to a light level around the system. However, such a modification is problematic because it alters the entire display and affects each user element being displayed.

BRIEF DESCRIPTION OF THE DRAWINGS

Some embodiments are illustrated by way of example and not limitation in the figures of the accompanying drawings.

DETAILED DESCRIPTION

Figure 1:
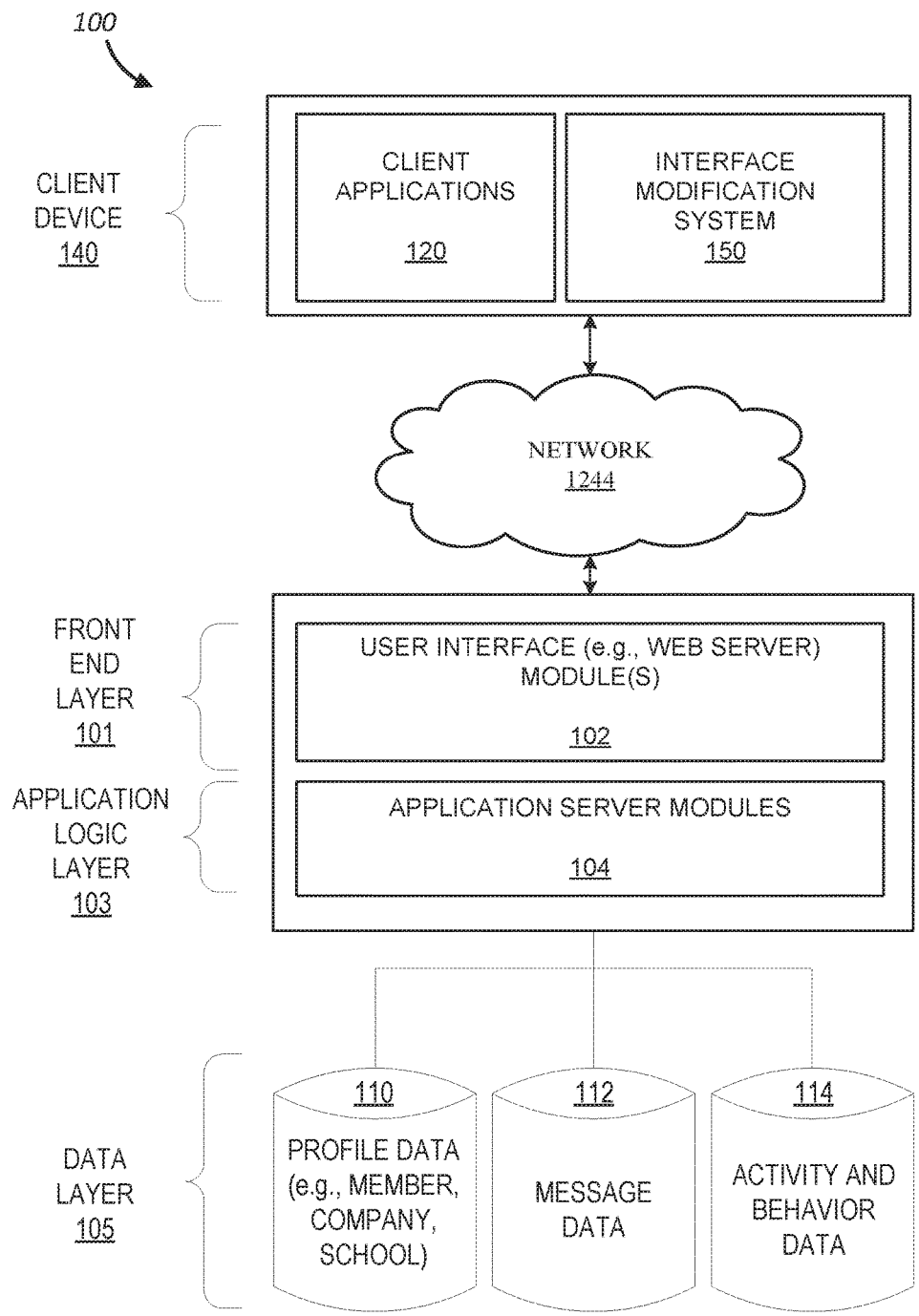
FIG. 1 is a block diagram illustrating various components or functional modules of an online social networking service, in an example embodiment.

The description that follows includes systems, methods, techniques, instruction sequences, and computing machine program products that embody illustrative embodiments of the inventive subject matter described in the present disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Example methods and systems are directed to modifying graphical elements based on environment. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Techniques for modifying graphical elements based on environment may be applied to a wide range of different scenarios. As technology advances, computing devices are used in a wider range of settings and/or environments. As a computing device is used in different environments, modifying usage of the device may increase operational efficiency. In one example, modifying graphical elements decreases an amount of work by a user interfacing with the computing device. In one example, the user is a member of an online social networking service.

In certain examples, a smart phone is sometimes held in the right hand and other times is held in the left hand. In this scenario, a member typically interfaces with a touch screen for the computing device using the thumb of the hand holding the device. Because the thumb may more easily reach graphical elements that are on the side of the interface by the thumb, moving graphical elements towards that side makes it easier for the member to interface with the device. Alternatively, moving other graphical elements away from the side of the thumb makes it more difficult for the member to select the graphical elements. Modifying graphical elements to accommodate other environmental conditions such as, but not limited to, low light, high acceleration and/or vibration, or other conditions can significantly affect how a member interfaces with the computing device.

In one example, a system modifies graphical elements to make it easier for a member to purchase features using certain graphical elements by moving graphical elements towards the member's hand. In some examples, the system moves button to a side by the member's hand and moves other graphical elements away from the member's hand. In one example, the system moves a button to one side or another and slides other control away from the member's hand to increase an amount of displayable space making real estate available for the button. In another example, the system changes locations of two graphical elements by swapping their respective positions. For example, a button being displayed on the left side of a display may be switched with a button being displayed on the right side of the display.

In other examples, the system makes it more difficult for a member to exit an application by moving certain graphical elements away from a user's hand. Other examples and scenarios are described herein which adjust member effort, ease of use, interfacing with a computing device. In one example, ease of use includes reducing a distance between the member's hand and the graphical element being modified. In another example, reducing member effort to interact with a graphical element includes reducing a time needed to interface with the graphical element. Of course, one skilled in the art may recognize other ways to adjust graphical element to make it either easier or harder for a member to interact with the graphical element and such embodiments are contemplated as being within the scope of this disclosure.

FIG. 1 is a block diagram illustrating various components or functional modules of an online social networking service 100, in an example embodiment. The online social networking service 100 may be utilized to select an application for message handling. In one example, the online social networking service 100 includes an interface modification system 150 that performs the various interface modification operations described herein.

A client device 140 includes a computing device capable of communicating with systems, applications, or layers of the online social networking service 100. In one example, the client device 140 communicates with the online social networking service 100 via a network 1244. In certain examples, the client device 140 is a personal computer, a laptop computer, a mobile computer, a smart phone, or another computing device configured to perform the various operations and/or methods described herein. As will be further described, in some examples the client device 140 includes multiple client applications 120, and the interface modification system 150. In certain embodiments, the interface modification system 150 modifies graphical elements of one or more of the client applications 120.

A front end layer 101 consists of a user interface module (e.g., a web server) 102, which receives requests from various client computing devices (e.g., client device 140) and communicates appropriate responses to the requesting client devices. For example, the user interface module(s) 102 may receive requests in the form of Hypertext Transfer Protocol (HTTP) requests, or other web-based, application programming interface (API) requests. In another example, the front end layer 101 receives requests from an application executing via a member's mobile computing device. In one example, a member submits media content for inclusion in the online social networking service 100, or requests media content from the online social networking service 100. In another example embodiment, the user interface module 102 provides a user interface for a member of the online social networking service 100 to retrieve a message.

An application logic layer 103 includes various application server modules 104, which, in conjunction with the user interface module(s) 102, may generate various user interfaces (e.g., web pages, applications, etc.) with data retrieved from various data sources in a data layer 105.

In some examples, individual application server modules 104 may be used to implement the functionality associated with various services and features of the online social networking service 100. For instance, the ability of an organization to establish a presence in the social graph of the online social networking service 100, including the ability to establish a customized web page on behalf of an organization, and to publish messages or status updates on behalf of an organization, may be services implemented in independent application server modules 104. Similarly, a variety of other applications or services that are made available to members of the online social networking service 100 may be embodied in their own application server modules 104. Alternatively, various applications may be embodied in a single application server module 104.

As illustrated, the data layer 105 includes, but is not necessarily limited to, several databases 110, 112, 114, such as a database 110 for storing profile data, including both member profile data and profile data for various organizations. Consistent with some examples, when a person initially registers to become a member of the online social networking service 100, the person may be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the database 110.

Similarly, when a representative of an organization initially registers the organization with the online social networking service 100, the representative may be prompted to provide certain information about the organization. This information may be stored, for example, in the database 110, or another database (not shown). In some examples, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or seniority level within a particular company. In some examples, importing or otherwise accessing data from one or more externally hosted data sources may enhance profile data for both members and organizations. For instance, with companies in particular, financial data may be imported from one or more external data sources, and made part of a company's profile.

The online social networking service 100 may provide a broad range of other applications and services that allow members the opportunity to share and receive information, often customized to the interests of the member. In some examples, the online social networking service 100 includes a photo sharing application that allows members to upload and share photos with other members. In some examples, members may be able to self-organize into groups, or interest groups, organized around subject matter or a topic of interest.

In other example embodiments, the database 112 includes messages transmitted between members of the online social networking service 100. In one example embodiment, the database 114 stores member activity and member behavior.

Figure 2:
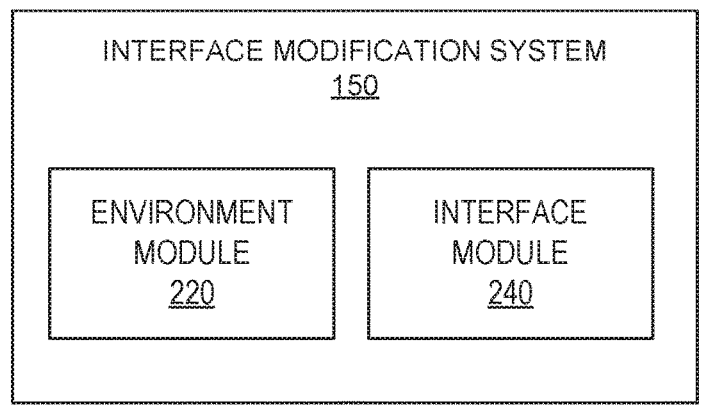
FIG. 2 is a block diagram illustrating one example system for modifying graphical elements based on environment, according to one example embodiment.

FIG. 2 is a block diagram illustrating one example system 200 for modifying graphical elements based on environment, according to one example embodiment. In one example embodiment, the interface modification system 150 includes an environment module 220 and an interface module 240.

In one example embodiment, the environment module 220 is configured to receive inputs from one or more environmental sensors that indicate an environment of the interface modification system 150.

In one example embodiment, the environmental sensor is a location sensor. In one example, the location includes GPS coordinates. In another example, the location is a generic location, such as, but not limited to, on a train, in a car, at home, in bed, at the dinner table, at home, at work, or the like. In one example, the environment module 220 determines that a member is on a train based on a movement path of location inputs consistent with a railway. In another example, the environment module 220 determines that the member is in a car based on location input indicating movement on a road at a certain speed (e.g., more than 20 MPH). In another example, the environment module 220 determines that the member is in bed based on location input and a layout of the member's home.

In another example embodiment, the environment detector is an accelerometer. In this example embodiment, the accelerometer measures acceleration of the interface modification system 150. In one example, the environment module 220 determines an instantaneous acceleration. In another example, the environment module 220 determines a period of time where acceleration inputs exceed a threshold value. In one example, the interface modification system 150 is riding in a car on a bumpy road. In response to the frequency of bumps exceeding a threshold frequency and the acceleration (e.g., the magnitude of the bumps) exceeding another threshold, the environment module 220 determines that the interface modification system 150 (or a member using the interface modification system 150) is in an environment that shakes above a certain amount. In another example, the environment module 220 determines that the interface modification system 150 is being carried by a member of the online social networking service 100.

In another example embodiment, the environment detector is an orientation sensor. In certain examples, the orientation sensor determines an orientation angle of the interface modification system 150. In one example, the orientation of the interface modification system 150 is level as compared with gravitational force and has acceleration below a threshold amount. In this example, the environment module 220 determines that the interface modification system 150 is lying on a flat surface.

In another example embodiment, the environment detector is a light sensor. In this example, the environment module 220 determines a light level at the interface modification system 150. In one example, the environment module 220 determines that it is day. In another example, the environment module 220 determines that it is night. In one example, the environment module 220 determines that a light level at the interface modification system 150 is below a threshold value.

In one example embodiment, the environment detector is a handedness module. As one skilled in the art may appreciate, a handedness module is configured to determine which hand a member is using to interface with a computing device executing the interface modification system 150. As one skilled in the art may appreciate, handedness may be determined using an orientation of the system, a current touch pattern on edges of the system, an arc of swipes received by the system, or the like. In one example, as an arc of a swipe gesture is directed towards the left hand, the handedness module determines that the member is using his/her left hand. In certain examples, a user using one hand or another to hold a device and interface with the device using the same hand, the user uses a thumb to select one or more graphical elements. In some example embodiment, a swipe by the thumb of the hand holding the device creates a swipe gesture having an arc directed towards the holding hand; accordingly, the handedness module determines that the member is using the holding hand (left or right).

In another example embodiment, the handedness module receives a heat map of a device and determines that a member is using either hand based, at least in part, on increased heat on one side or another of the device. In one example embodiment, a device includes thermocouples on a particular side of the device. As the thermocouples sense increased temperature on one side of the display that indicate either a palm, or a set of fingers, the handedness module determines a hand that the user is using to hold the device. In one example, the thermocouples send a palm on one side of the display and four digits on the other side of the display.

In one example, based on input from the handedness module, the environment module 220 determines that a member is using a left hand to operate a computing device operating the interface modification system 150. In another example, the environment module 220 determines that a member is using a right hand to operate a computing device executing the interface modification system 150.

In another example embodiment, the environment module 220 determines a type of device that operates the interface modification system 150. In one example, the type of device that operates the interface modification system 150 is a wearable device with a graphical interface less than two inches wide. In another example, the type of device is a smart phone that is less than eight inches wide. In another example, the type of device is a tablet that is less than 11 inches wide. In another example, the type of device is a larger device with an interface larger than 10 inches wide. Of course, other sizes and values may be used. In other examples, a smart phone may have an interface that is larger than 8 inches wide. Therefore, these sizes are examples only.

In one example embodiment, the environment module 220 determines that the device is of a type that is typically used by two hands (e.g., a tablet device). In another example, the environment module 220 determines that the device is of a type that is typically held by one hand. In one example, the environment module 220 queries an operating system for the device to determine the type of device. In one example embodiment, the environment module 220 determine a number of hands used for a system by looking up the device type in a database configured to return typical hand use. In another example embodiment, the environment module 220 queries the operating system for the device to determine typical hand usage.

In one example embodiment, the environment module 220, based on input from a clock (one example of an environment detector), determines a time of day. In another example, the environment module 220, based on input from a meteorological sensor, determines a weather condition (e.g., precipitation, humidity, barometric pressure, etc.). In other example embodiments, the environment module 220 determines any other type of environment, as one skilled in the art may appreciate. In one example embodiment, the environment module 220 determines that it is raining at or on a computing device and the interface module 240 increases a capacitive threshold for a capacitive touch screen. In this way, the interface module 220 distinguishes drop of rain on a touch screen from touches of a finger of the user.

In another example embodiment, the interface module 240 receives an indication of one or more graphical elements at a graphical user interface. In one example, the interface module 240 receives a message that identifies the one or more graphical elements. In another example, the interface module 240 receives the indication by a member manipulating a user interface. In another example, the interface module 240 receives the indication by querying a remote database.

In one example embodiment and in any of the previously described ways, the interface module 240 also receives the identified graphical elements with modifications to the graphical elements in response to certain environmental conditions. In one example, the interface module 240 receives indications that a certain graphical element is to be increased in size in response to an acceleration environment above a threshold amount. In one example, the interface module 240 increases the size of keys for a keyboard, making it easier for a member to select keys of the keyboard. In certain example embodiment, graphical elements and their respective modifications according to different environmental conditions are stored in a database and the interface module 240 queries the database to determine graphical elements to modify and adjustments for different environmental conditions for the respective graphical elements.

In another example embodiment, the graphical elements are modified based on operations associated with the graphical elements. For example, a "close" or "exit" operation may be associated with several different graphical elements. In one example, the identified graphical elements are window management buttons, such as, but not limited to, a close button, a minimize button, and a maximize button as one skilled in the art may appreciate. In one example, modification to a graphical elements are for all graphical elements associated with the "exit" operation. Of course, there may be different types of graphical elements associated with other operations and this disclosure is not limited in this regard.

In another example embodiment, the interface module 240 modifies an identified graphical element to adjust member effort to interact with the identified graphical element. In one example, the interface module 240 modifies the graphical element according to the environment of the interface modification system 150. In one example embodiment, the interface module 240 modifies an identified graphical element based on an operation associated with the graphical element as described herein.

In one example, the environment module 220 determines that a light level is below a threshold value and the interface module 240 modifies a contrast for certain identified graphical elements at a display for the interface modification system 150. In one example, the interface module 240 increases contrast for identified graphical elements that display text. Similarly, the interface module 240 may not modify graphical elements that are not specifically identified.

In another example embodiment, the environment module 220 determines that the computing device that includes the interface modification system 150 is operated using one hand and that the member using the computing device is using his/her right hand. In response, the interface module 240 modifies a graphical element by moving a menu button from a left side of a display to a right side of the display. In one example embodiment, a side of the display includes either left-most pixels being illuminated via the display or right-most pixels being illuminated via the display.

In this way, because a member using a device with one hand typically interacts with the display using the thumb of the right hand, moving graphical interface elements closer towards the right side decreases an effort exerted by the member interacting with the graphical elements.

In another example, an application may be configured to make it more difficult for a user to close or exit the application. In this example, the environment module 220 determines that the member is using the device using his/her left hand, and the interface module 240 moves a close or exit button to a right side of the screen causing the user to exert more effort to select the button.

In another example embodiment, the interface module 240 identifies one or more graphical controls that close or exit the application and modifies the controls to make it more challenging for the user to select them. In one example, the interface module 240 moves the exit menu further away from a hand being used by the member to interface with the system. In another example, the exit button is moved further away from the member's hand. In another example, the exit button is decreased in size to make it more difficult for the member to select it.

In one example embodiment, an application includes a menu bar on one or another side of a display. In one example, in response to the environment module 220 determining that the member is using his/her right hand, the interface module 240 moves the menu bar to the right side of the display, which makes it easier for a right-handed member to select the menu bar using the thumb of the right hand. In another example embodiment, the interface module 240 moves a "like" button to be more easily accessed using one or another thumb of the user. In one example embodiment, the menus are configured to be on either side of the display, and the interface module 240 determines which side of the display to position the menu bar based, at least in part, on the environment.

In one example embodiment, the environment module 220 determines that the member is experiencing physical vibration above a threshold value based, at least in part, on input from an accelerometer. In response and according to one example embodiment, the interface module 240 increases the size of one or more graphical elements so that it is easier for the member to interact with the graphical elements. In other examples, the interface module 240 increases a size of text in a graphical element, changes colors of a graphical element, or modifies another property of the graphical element according to a predefined modification associated with the environmental condition.

In another example embodiment, the interface module 240 changes a base type of a graphical element based on a certain environmental condition. In one example, the interface module 240 changes a menu to a button (which may in turn present a menu).

In one example embodiment, the environmental condition is vibration above a threshold amount and the interface module 240 changes a scroll bar graphical element to "up" and "down" buttons. Because buttons have a larger selection area as compared with a scroll bar, this change decreases user effort interacting with the graphical element. In another example embodiment, the interface module 240 increases a width of a vertical scroll bar, or increases a height of a horizontal scroll bar. In another example embodiment, the interface module 240 restructures a menu by altering the menu to be a vertical mirror image of the original menu so that menu items on the left side are now on the right side. In another example embodiment, the interface module 240 changes a vertical scroll bar to an indexing bar (one example of changing a base type of a graphical element).

In another example embodiment, an application may be configured to decrease effort exerted by the member to select an advertisement in the application. In this scenario, in response to the member using his/her left hand to interface with the application, the interface module 240 moves the advertisement to be closer to the member's left thumb.

In one example embodiment, the interface module 240 modifies a graphical element and tracks member interactions with the modified graphical element. In response to many different modifications, the interface module 240 then modifies the graphical element according to which type of modification affected interaction with the graphical element the most. In one example, the interface module 240 counts a number of interactions with the graphical element in response to each type of modification. In response to other environmental conditions, the interface module 240 may modify the graphical element according to the modification that resulted in the highest number of interactions in specific environments over a period of time.

In another example embodiment, the interface module 240 uploads graphical element interactions metrics to a cloud server for further analysis. The cloud server may then analyze interactions from many different users. In one example, the interface module 240 modifies the graphical element according to most influential modifications based on results from many users.

In one example embodiment, the environment module 220 learns a usage pattern (e.g., an operational environment) of the interface modification system 150. In one example, the member consistently (e.g., more than 80% of the time)

uses the device that includes the interface modification system 150 with one or another hand at certain times of the day. In one example, the member uses the device with both hands after 8 pm. In one example, in response to the member using the device after 8 pm, the environment module 220 may determine that the member is using the device with both hands based, at least in part, on previously learned use patterns.

In another example embodiment, the environment module 220 learns a usage pattern by the member based on a location of the member. In one example, the member uses the device while on a train each Monday at 9 am. In response to another Monday at 9 am, the environment module 220 determines that the member is on a train, and the interface module 240 modifies a graphical element based on acceleration above a threshold value because the member is on a train. This may be the case regardless of whether the member is actually experiencing acceleration above the threshold value at the precise moment in time.

In another embodiment, the interface module 240 measures member interaction after modifying the base element type of a graphical element. By making modifications and measuring member interactions, the interface module 240 learns a more effective graphical element base type. In one example, the interface module 240 modifies a horizontal scroll bar to left and right buttons and measures member interaction with the buttons. In one example, the interface module 240 counts member interactions with the graphical element on a daily basis.

In another example embodiment, the interface module 240 uploads member interaction data to a remote system. In this way, as the member uses different devices, the interaction data from the member using a wide variety of different device types is uploaded to the remote system. The interface module 240 may then receive the interaction data (from multiple devices) and determine a modification to a graphical element type that results in a most significant effect on member interactions using the graphical element.

In certain embodiments, the environment module 220 and/or the interface module 240 is implemented at a different software layer than the application being modified. In one example, the environment module 220 is implemented as part of an operating system for the system. In this way, an application may be programmed to retrieve environmental conditions using the environment module 220. In another example embodiment, the interface module 240 commands an application to modify one or more graphical elements as described herein.

Figure 3:
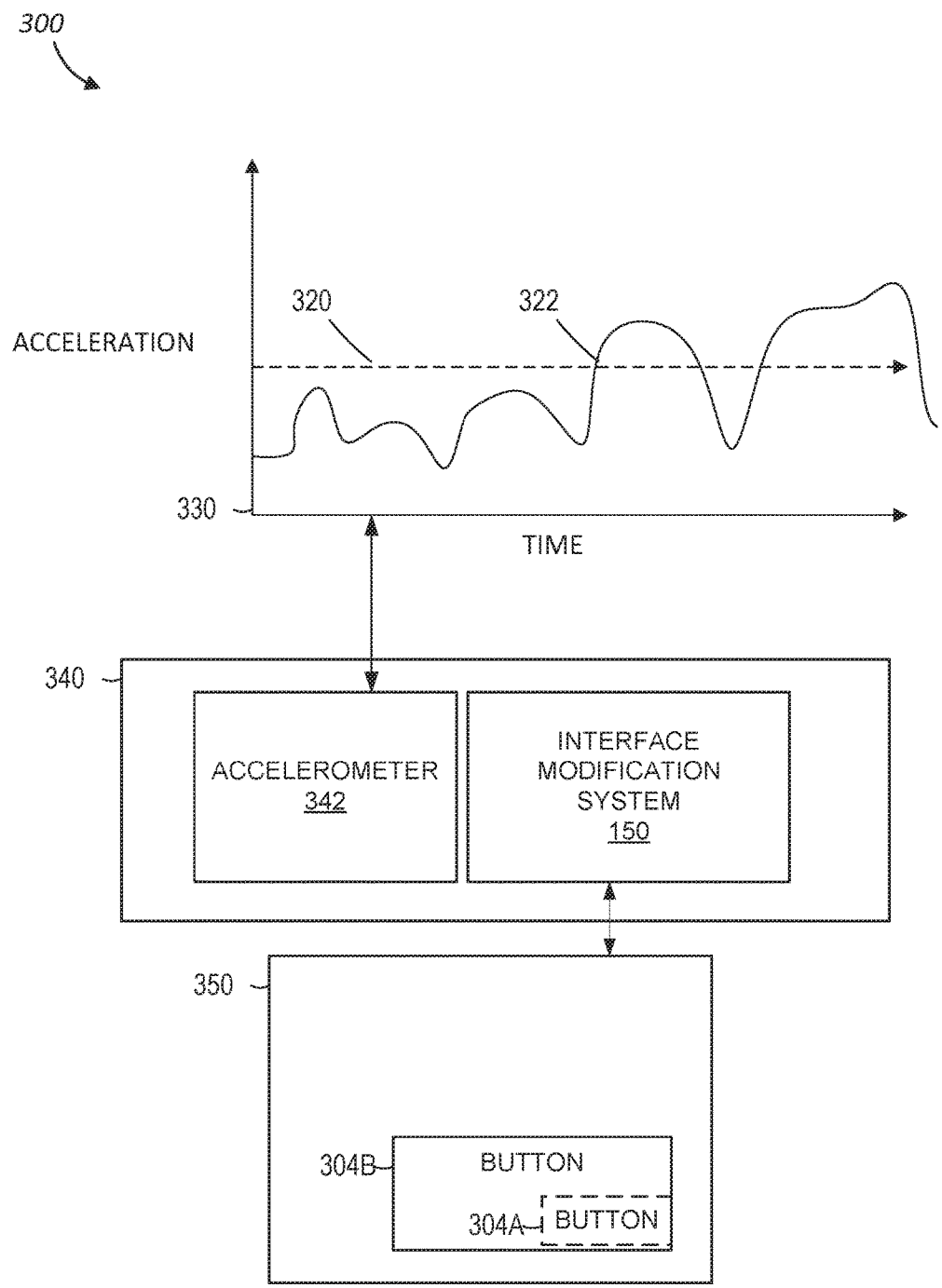
FIG. 3 is a block diagram illustrating an example scenario for modifying graphical elements based on environment, according to one example embodiment.

FIG. 3 is a block diagram illustrating an example scenario 300 for modifying graphical elements based on environment, according to one example embodiment. In this example embodiment, a computing device 340 includes an accelerometer 342 and the interface modification system 150.

In one example embodiment, the accelerometer 342 measures acceleration of the computing device 340. In one example, the measured acceleration is as presented in a chart 330. In another example, as the measured acceleration value exceeds a threshold acceleration value 320 at a point 322, the interface module 240 modifies at least one of the graphical elements at a user interface 350. In another example embodiment, the interface module 240 increases a size of a button from a first size 304A to a second size 304B. In one example, the interface module 240 keeps the increased size of the button for a period of time. In one example, the period of time is five seconds.

Figure 4:
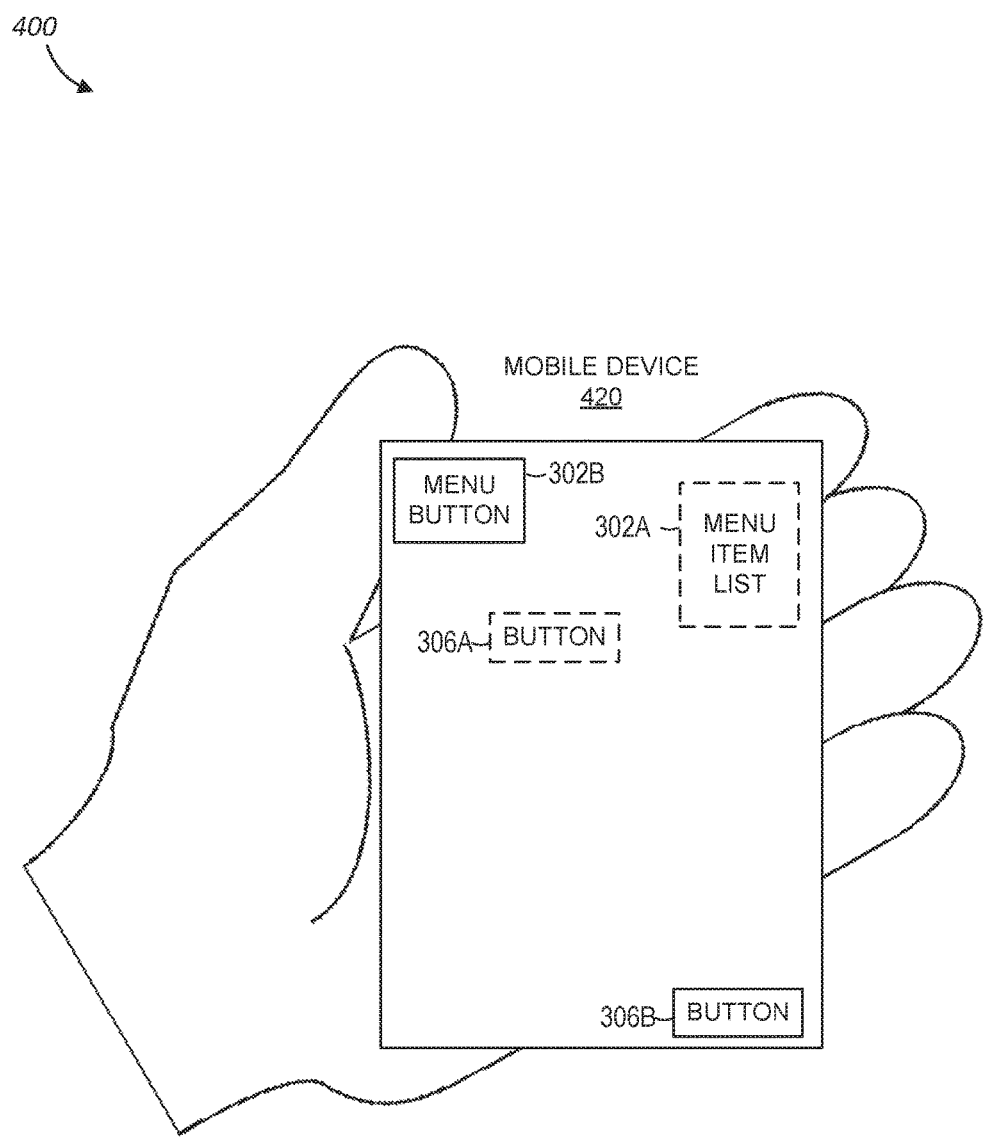
FIG. 4 is a block diagram illustrating another example scenario for modifying graphical elements based on environment, according to one example embodiment.

FIG. 4 is a block diagram illustrating another example scenario 400 for modifying graphical elements based on environment, according to one example embodiment.

In one example embodiment, the environment module 220 determines that a mobile device 420 is being held by a left hand of a member of the online social networking service 100. In another example embodiment, the interface module 240 modifies a location and a base type for a graphical element (e.g., an identified graphical element). In one example, the interface module 240 modifies an identified menu item list 402A at a first location to a menu button 402B at another location. In this example, the interface module 240 moves the graphical element so that the member more easily interacts with the graphical element using a thumb of the left hand.

In another example embodiment, the interface module 240 modifies a location of Button 306A to a location 306B that is further away from a thumb of the left hand making it more difficult for the member to interact with the Button 306B. In one example, the locations 306A and 306B are predefined locations.

Figure 5:
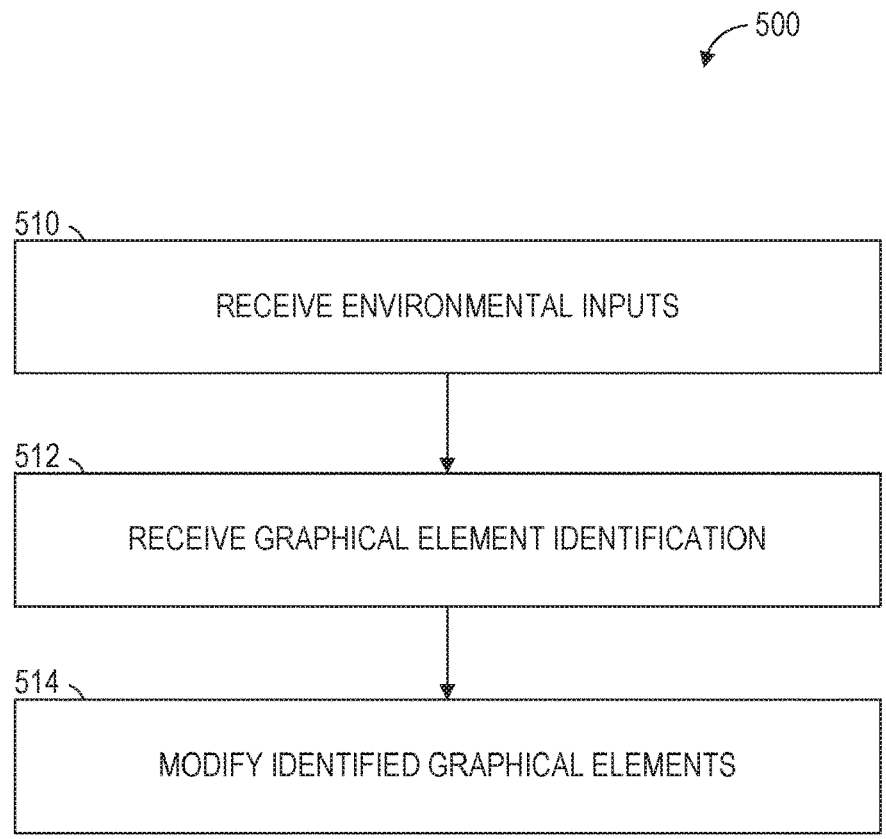
FIG. 5 is a flow chart diagram illustrating a method of modifying graphical elements based on environment, according to an example embodiment.

FIG. 5 is a flow chart diagram illustrating a method 500 of modifying graphical elements based on environment, according to an example embodiment. According to one example embodiment, operations in the method 500 are performed by the interface modification system 150, using modules described above with respect to FIG. 2. As shown in FIG. 5, the method 500 includes operations 510, 512, and 514.

In one example embodiment, the method 500 begins and at operation 510 the environment module 220 receives inputs from one or more environmental sensors that indicate an environment. In certain embodiments, the environmental sensors include at least one of a location sensor, an accelerometer, an orientation sensor, a light sensor, and a handedness module.

The method 500 continues at operation 512 and the environment module 220 receives identification of one or more graphical elements at a graphical user interface. In one example, the environment module 220 retrieves identification of graphical elements from an application configured to present the graphical elements. In another example, the application also identifies the corresponding changes for the graphical elements in response to certain environmental conditions. In one example, the environment module 220 queries the application for the graphical elements that are modifiable and in which way they are modifiable. In another example, the environment module 220 receives identification from a remote system. In one example, each of the graphical elements has a numerical identifier and the identification of the graphical elements comprises the associated numerical identifiers. In another example embodiment, modifications for specific environmental conditions are stored in a file that is accessible by the interface module 240.

The method 500 continues, and at operation 514, the interface module 240 modifies the identified graphical elements to adjust user effort interacting with the identified graphical elements and according to the environment of the system. In one example, in response to the environment module 220 determining an environmental condition, the interface module 240 loads the appropriate modifications from the file and performs the indicated modifications.

Figure 6:
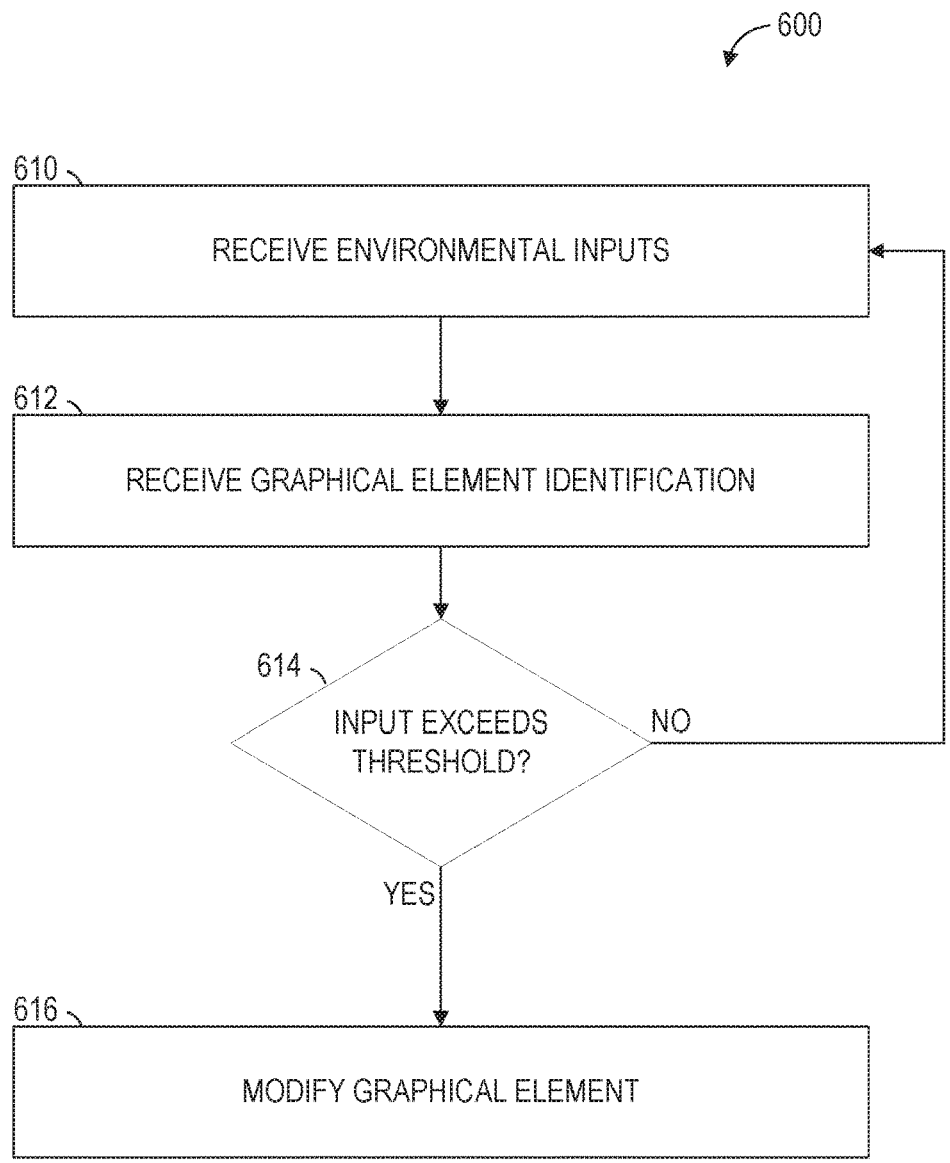
FIG. 6 is another flow chart diagram illustrating a method of modifying graphical elements based on environment, according to an example embodiment.

FIG. 6 is another flow chart diagram illustrating a method 600 of modifying graphical elements based on environment according to an example embodiment. According to one example embodiment, operations in the method 600 are performed by the interface modification system 150, using modules described above with respect to FIG. 2. As shown in FIG. 6, the method 600 includes operations 610, 612, 614, and 616.

In one example embodiment, the method 600 begins and at operation 610, the environment module 220 receives inputs from many different environmental sensors indicating a current operating environment. In one example, the environmental sensors include a light sensor and a handedness module.

The method 600 continues at operation 612 and the environment module 220 receives identification of multiple graphical elements at a graphical user interface. In one example, the environment module 220 retrieves identification of modifiable graphical elements from an application configured to present the graphical elements. In another example, the environment module 220 receives identification from a member of the online social networking service 100.

The method 600 continues, and at operation 614, the interface module 240 determines whether any of the environmental inputs exceeds a respective threshold value for the environment. In response to none of the environmental inputs exceeding a respective threshold value, the method 600 continues at operation 610 and the environment module 220 receives additional environmental inputs.

In response to an environmental input exceeding a threshold value for the environmental input, the method 600 continues at operation 616. In one example, the environmental sensor is an accelerometer and the threshold value is a specific amount of acceleration. In one example, the specific amount of acceleration is 50 meters per second squared. In another example, the specific amount of acceleration includes an acceleration value above 20 meters per second squared for each of the last five seconds (or any other period of time).

At operation 616, the interface module 240 modifies the identified graphical elements to adjust user effort interacting with the identified graphical elements and according to the environment of the system as described herein.

Figure 7:
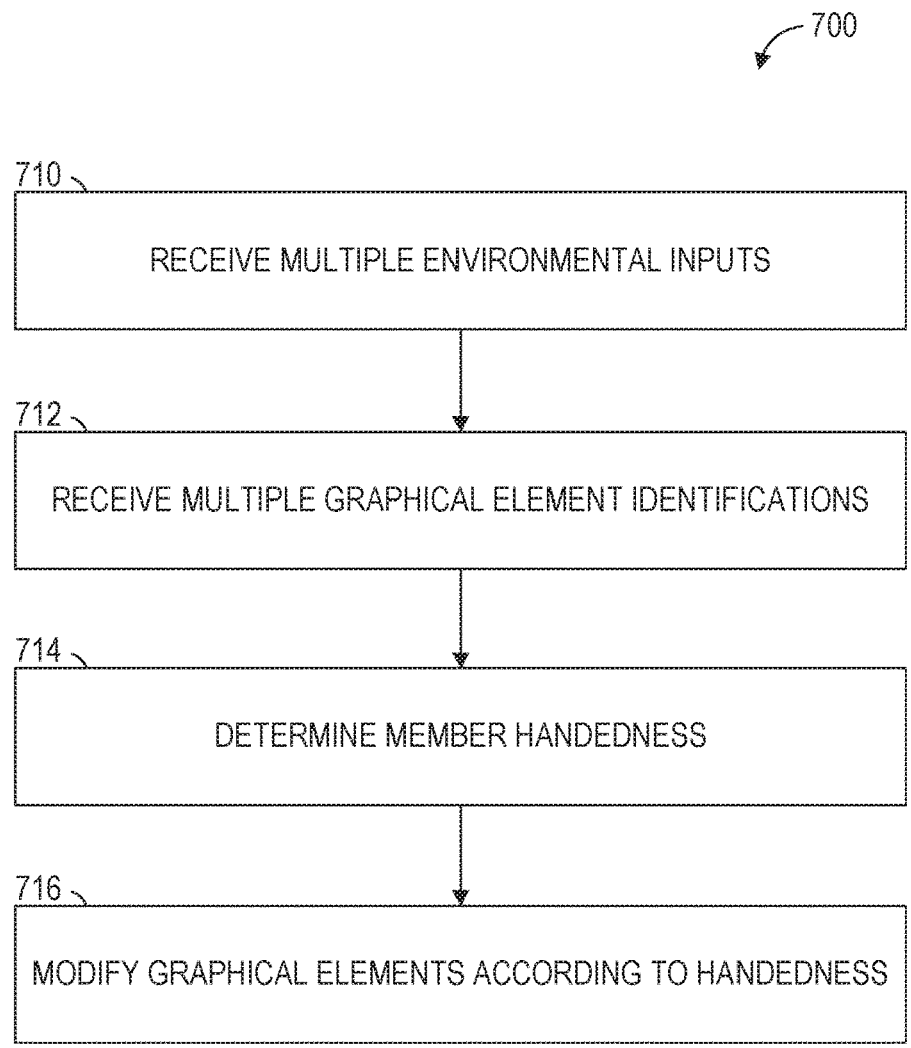
FIG. 7 is a flow chart diagram illustrating another method of modifying graphical elements based on environment, according to an example embodiment.

FIG. 7 is a flow chart diagram illustrating another method 700 of modifying graphical elements based on environment, according to an example embodiment.

In one example embodiment, the method 700 begins, and at operation 710, the environment module 220 receives multiple environmental inputs. In one example, the environment module 220 receives input from a handedness module. The method 700 continues at operation 712 and the environment module 220 receives identification of multiple graphical elements. In one example, the environment module 220 receives identification of a menu bar that may switch sides of the display according to handedness.

The method 700 continues at operation 714 and the environment module 220 determines member handedness based on input from the handedness module. The method 700 continues at operation 716 and the interface module 240 modifies one or more graphical elements according to handedness. In one example, the interface module 240 modifies a menu bar by changing a side of the screen to use to present the menu bar based on the handedness of the member. In one example, the member is using his/her right hand and the interface module 240 moves the menu bar to the right side of the screen to decrease user effort interacting with the menu bar.

Figure 8:
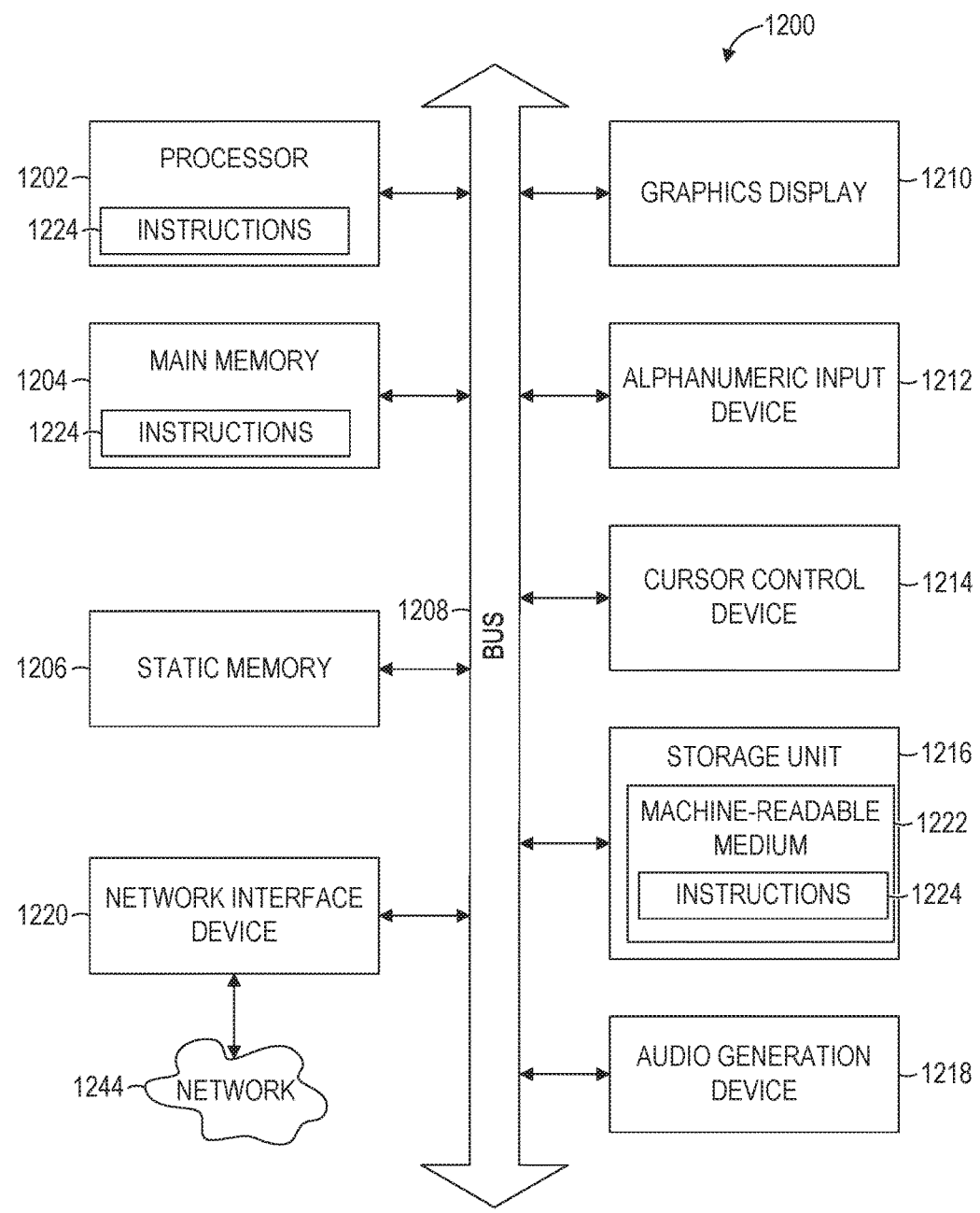
FIG. 8 is a block diagram illustrating components of a machine able to read instructions from a machine-readable medium.

FIG. 8 is a block diagram illustrating components of a machine 1200 able to read instructions from a machine-readable medium. Specifically, FIG. 8 shows a diagrammatic representation of the machine 1200 in the example form of a computer system within which instructions 1224 (e.g., software) for causing the machine 1200 to perform any one or more of the methodologies discussed herein may be executed. In alternative embodiments, the machine 1200 operates as a standalone device or may be connected (e.g., networked) to other machines. In a networked deployment, the machine 1200 may operate in the capacity of a server machine or a client machine in a server-client network environment, or as a peer machine in a peer-to-peer (or distributed) network environment. The machine 1200 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1224, sequentially or otherwise, that specify actions to be taken by that machine. In one example embodiment, the environment module 220 determines the machine's 1200 device type. Further, while only a single machine is illustrated, the term "machine" shall also be taken to include a collection of machines that individually or jointly execute the instructions 1224 to perform any one or more of the methodologies discussed herein. In certain embodiments, the various modules described in FIG. 2 are implemented as part of the instructions 1224.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The machine 1200 may further include a graphics display 1210 (e.g., a plasma display panel (PDP), a light emitting diode (LED) display, a liquid crystal display (LCD), a projector, or a cathode ray tube (CRT)). The machine 1200 may also include an alphanumeric input device 1212 (e.g., a keyboard), a cursor control device 1214 (e.g., a mouse, a touchpad, a trackball, a joystick, a motion sensor, or another pointing instrument), a storage unit 1216, an audio generation device 1218 (e.g., a speaker), and a network interface device 1220.

The storage unit 1216 includes a machine-readable medium 1222 on which are stored the instructions 1224 (e.g., software) embodying any one or more of the methodologies, modules, or functions described herein. The instructions 1224 may also reside, completely or at least partially, within the main memory 1204, within the processor 1202 (e.g., within the processor's cache memory), or both, during execution thereof by the machine 1200. Accordingly, the main memory 1204 and the processor 1202 may be considered as machine-readable media. The instructions 1224 may be transmitted or received over a network 1244 via the network interface device 1220.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 1200), such that the instructions, when executed by one or more processors of the machine (e.g., processor 1202), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve modifying physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
   one or more processors; and
   a machine-readable storage device having instructions stored thereon, which, when executed by the one or more processors, perform cause the system to perform operations comprising:
      receiving inputs from one or more environmental detectors that detect an environment of the system, the environmental detectors comprising at least one of:
         a location sensor configured to determine a location of the system;
         a meteorological sensor configured to determine weather;
         an accelerometer configured to determine acceleration of the system;
         an orientation sensor configured to determine orientation of the system;
         a light sensor configured to determine a light level of the system and a handedness module configured to determine hand usage of the system;
      receiving identification of one or more graphical elements of a graphical user interface for the system, the identified one or more graphical elements comprising a close button; and
      modifying the identified one or more graphical elements to increase effort by a member for interacting with the identified one or more graphical elements by moving the close button away from a hand being used by the member and according to the environment of the system.

2. The system of claim 1, wherein the environmental detectors comprise the light sensor, the identified one or more graphical elements include currently displayed graphical elements; and modifying the identified one or more graphical elements comprises increasing a contrast for the identified one or more graphical elements.

3. The system of claim 1, wherein the environmental detectors comprises the accelerometer, the accelerometer indicating an acceleration above a threshold acceleration; the identified one or more graphical elements comprise a keyboard; and the modifying the identified one or more graphical elements comprises increasing a size of keys for the keyboard.

4. The system of claim 1, wherein modifying the identified one or more graphical elements comprises changing a base type of the identified one or more graphical elements.

5. The system of claim 1, wherein the environment comprises a device type of the system.

6. The system of claim 1, wherein the environmental detector comprises the handedness module, the environment is a handedness of the member using the system.

7. The system of claim 6, wherein the handedness module learns a pattern of handedness of the member based on at least one of:
   the location of the system, the orientation of the system, and a time of day.

8. The system of claim 1, wherein the operations further comprise learning modifications to the identified one or more graphical elements by altering the identified one or more graphical elements and measuring member interactions with the identified one or more graphical elements.

9. The system of claim 1, wherein the environment is a handedness of the member using the system, the identified one or more graphical elements are window management buttons, and modifying the identified one or more graphical elements decreases effort by the member by moving the window management buttons closer to the hand being used by the member.

10. A method comprising:
    receiving inputs from one or more environmental detectors that detect an environment of a system, the environmental detectors comprising at least one of:
       a location sensor configured to determine a location of the system;
       an accelerometer configured to determine acceleration of the system;
       a meteorological sensor configured to determine weather;
       an orientation sensor configured to determine orientation of the system;
       a light sensor configured to determine a light level of the system and a handedness module configured to determine hand usage of the system;
    receiving identification of one or more graphical elements at a graphical user interface, the identified one or more graphical elements comprising a close button; and
    modifying the identified one or more graphical elements to increase effort by a member by moving the close button away from a hand being used by the member using modifications associated with the environment of the system.

11. The method of claim 10, wherein one of the environmental detectors is the light sensor, the environment comprises a light level that is below a threshold light level, the identified one or more graphical elements include currently displayed graphical elements, and modifying the identified one or more graphical elements comprises increasing a contrast for the identified one or more graphical elements.

12. The method of claim 10, wherein one of the environmental detectors is the accelerometer, the environment is acceleration above a threshold acceleration, the identified one or more graphical elements comprise a keyboard, and modifying the identified one or more graphical elements comprises increasing a size of keys for the keyboard.

13. The method of claim 10, wherein one of the environmental detectors is the handedness module, and the environment is a handedness of the member of an online social networking service.

14. The method of claim 13, further comprising learning a pattern of handedness of the member based on one of the location of the system, the orientation of the system, and a time of day.

15. The method of claim 10, further comprising learning the modifications by modifying the identified one or more graphical elements and measuring member interactions with the identified one or more graphical elements.

16. The method of claim 10, wherein the environment, is a handedness of the member using the system, the identified one or more graphical elements are window management buttons, and altering the identified one or more graphical elements comprises moving the window management buttons closer to the hand being used by the member.

17. A machine-readable storage device having instructions stored thereon, which, when executed by a processor, cause the processor to perform operations comprising:
receiving inputs from one or more environmental detectors that detect an environment of a system, the environmental detectors comprising at least one of:
a location sensor configured to determine a location of the system;
an accelerometer configured to determine acceleration of the system;
an orientation sensor configured to determine orientation of the system;
a light sensor configured to determine a light level of the system;
and a handedness module configured to determine hand usage of the system;
receiving identification of one or more graphical elements at a graphical user interface, the identified one or more graphical elements comprising a close button; and
modifying the identified one or more graphical elements to increase effort by a member in interacting with the identified one or more graphical elements by moving the close button away from a hand being used by the member and according to the environment of the system.

18. The machine-readable storage device of claim 17, wherein one of the environmental sensors is the handedness module, and the environment is a handedness of the member of an online social networking service.

* * * * *